US009139754B1

(12) United States Patent
Livingston

(10) Patent No.: US 9,139,754 B1
(45) Date of Patent: Sep. 22, 2015

(54) SUBSTRATE-PROTECTING TREATMENT

(71) Applicant: James Lind Livingston, Midland, TX (US)

(72) Inventor: James Lind Livingston, Midland, TX (US)

( * ) Notice: Subject to any disclaimer, the term of this patent is extended or adjusted under 35 U.S.C. 154(b) by 470 days.

(21) Appl. No.: 13/629,616

(22) Filed: Sep. 28, 2012

Related U.S. Application Data

(60) Provisional application No. 61/546,885, filed on Oct. 13, 2011.

(51) Int. Cl.
*B32B 23/04* (2006.01)
*C09D 191/00* (2006.01)

(52) U.S. Cl.
CPC ................... *C09D 191/00* (2013.01)

(58) Field of Classification Search
CPC .............. C08K 5/34; C08K 5/20; C08K 5/01; C08K 5/05; C08K 5/07; C08K 5/46; C08K 5/56; C09D 191/00
USPC ..................... 524/91, 102, 377, 429; 428/536
See application file for complete search history.

(56) References Cited

U.S. PATENT DOCUMENTS

| 5,763,510 | A * | 6/1998 | Janeway ........................ 524/91 |
| 6,827,949 | B2 | 12/2004 | Yoshida et al. |
| 2008/0233060 | A1 | 9/2008 | Grune |
| 2011/0229726 | A1 | 9/2011 | Benson |

OTHER PUBLICATIONS

B. Dave Oomah et al: "Characteristics of raspberry seed oil" Food Chemistry 69 (2000) 187-193.*
Erasmus, Fat Content and fatty acid composition of seed oils, htttp://curezone.org/foods/fatspercentage.asp.
Fats, Oils, Fatty Acids, Triglycerides, http://www.scientificpsychic.com/fitnessfattyacids1.html.
Fatty acid composition of some plant oils, http:\\www.cuperlipid.org/glycer/glyc0064.htm.
Fatty Acid Content of Refined Vegetable Oils, http:\\thepaleodiet.com/nutritional-tools/fatty-acids-content-of-refined-vegetable-oils/.
Moringa Facts, http:\\www.my-healthy-choice.com/moringa.html.
Nagyvary, et al., Mineral Preservatives in the Wood of Stradivari and Guarneri, vol. 4, issue 1 PloS One (Jan. 2009).
Harrell, Accidental Genius: Why s Stradovarius Sounds So Good, Time (Feb. 15, 2009), http:\\www.time.com/time/printout/0,8816,1878425,00.html.
Gezelius, et al., Free amino acids and protein in Scots pine seedlings cultivated at different nutrient availabilities, Tree Physiology 13, 71-86 (Jul. 13, 1992).
Anti-inflammatory properties of Moringa Oleifera, http:\\oleia.net/clinical_studies/moringa.pdf.
Chaves, et al., Wood Consumption by Geoffroyi's Spider Monkeys and Its Role in Mineral Supplementation, 6:9 PLoS one e25070 (Sep. 2011).
Rao, et al. Tracing the History of Nuclear Releases: Determination of 129I in Tree Rings, Environ. Sci. Technolo. 2002, 36, 1271-1275.
Ashemraf, et al. Fatty Acids in Moringa oleifera Oil, Jour. Chem. Soc. Pak vol. 29 No. 4, at 343 (Aug. 2007).
Akzo Nobel, Material Safety Data Sheet, DEK Finish—Natural (Jan. 20, 2006).
Timber Pro UV, Material Safety Data Sheet, Deck and Fence Formula.
Rustoleum Corporation, Material Safety Data Sheet, Woodlife 1-GL 4 Pk Coppercoat Green (May 4, 2011).
PPG, Material Safety Data Sheet, Olympic Maximum Clear Sealant (Aug. 15, 2012).
Rust-Oleum Corporation, Material Safety Data Sheet WDCARE 1 GL 2PK VARA OILSTN (Sep. 29, 2011).
Robbins, et al, Mold, Housing & Wood, Western Wood Products Association (2002).
Pettersen, Roger Chapter 2—The Chemical Composition of Wood, [Need Book Title} American Chemical Society (1984).
Budwig, Johanna Flaxoil As a True Aid Against Arthritis, Heart Infarction, Cancer and Other Diseases (1994).
Botanic Oil Innovations, Inc., Red Raspberry Seed Oil.
Abdul, et al, Seed oil composition of red raspberry (Rubus ideaus) fruit in Sulaimani city, Middle East J. of Internal Med. vol. 5, Iss. 3 at 39.
Oregon Raspberry and Blackberry Commission, Assessing Marketing Opportunities for Raspberr and Blackberry Seeds.
Northern Sun-ADM, Material Safety Data Sheet, Scientific Boiled Linseed Oil (Mar. 8, 2004).
Western Kentucky Bio 113-Lipids, http:\\bioweb.wku.edu/biol115/wyatt/biochem/lipid/lipid1.htm.
http:\\vitafolks.com/id66.html.
Gliszczynska-Swiglo, et al, Topopherol Content in Edible Plaint Oils, Pol. J. of Food and Nutr. Sci. 2007 vol. 57, No. 4(A) pp. 157-161.
Red Raspberry Seed Oil (Organic), http:\\www.aromaticsinternational.com/red-raspberry.
Spirulina's Nutritional Analysis, http:\\www.naturalways.com/spirulina-analysis.htm.
Chlorella Nutritional Analysis, http:\\naturalways.com/chlorella-nutritional-analysis.htm.
Sesame, Getting sun protection from natural ingredients (Apr. 5, 2010), http:\\www.vivawoman.net/2010/04/05/getting-sun-protection-from-natural-ingredients/.
Nature's Way, Alive! Liquid Multi, http:\\naturesway.com/Products/Energy-Endurance/15395-Alive-Liquid-Multi.aspx.
Facts About Spirulina, http:\\wdatech.free.fr/CSVTECH/spirulinafacts.htm.
Chlorella Growth Factor 100% Pure (50mL) liquid by BioPure, http:\\www.worldwellnessstore.com/chlorella-growth-factor-100percent-pure-50ml-liquid-by-Biopure.
Oomah, et al, Characteristics of raspberry (Rubus idaeu L.) seed oil, Food Chemistry 69 at 187-193 (2000).

* cited by examiner

*Primary Examiner* — Leszek Kiliman
(74) *Attorney, Agent, or Firm* — Plager Schack LLP

(57) ABSTRACT

A treatment for substrates such as wood protects against broad-spectrum UV degradation. The treatment includes a vegetable oil, an organic oil and a liquid supplement and includes a high solids content. While containing substantially no volatile organic compounds, the biodegradable treatment is also quick-drying and provides a number of wood-restoring and rejuvenating elements.

18 Claims, No Drawings

SUBSTRATE-PROTECTING TREATMENT

CROSS REFERENCE TO RELATED APPLICATIONS

This application claims the priority benefit of U.S. Provisional Application No. 61/546,885 filed on Oct. 13, 2011 which is incorporated herein by reference in its entirety.

BACKGROUND

The present disclosure relates to providing protective treatments to substrates. In particular, the disclosure relates to providing protective treatments to biological material substrates such as wood.

For millennia, wood has found use in a variety of applications including as a structural element in construction and as a medium for artistic sculptural pursuits. The carbohydrates cellulose and hemicellulose account for 75% of wood's most valuable components. Additionally, for each 45.35 kgs of cut, air-dried wood there are approximately 0.45 to 0.91 kgs of essential minerals and nutrients. Up to 56 biological components including vitamin E (mixed alpha, gamma and delta tocopherols), twelve additional vitamins, thirteen minerals, nitrogen, eighteen amino acids, chlorophyll, proteins, carbohydrates, lipids, nucleic acids and six fatty acids are also found in both growing and harvested woods.

In outdoor applications, wood is frequently treated with one or more wood protection substances to, for example, reduce its vulnerability to moisture and ultraviolet (UV) light and the damages associated therewith. A great majority of wood protection products, including many labeled as being green, contain ingredients hazardous and damaging to wood itself. Instead of containing wood-rejuvenating ingredients, many wood protection products contain hazardous and other man-made chemicals which do not naturally occur in wood and shorten rather than lengthen the life span of harvested wood. Following application, many wood coating or protection products actually accelerate the degradation of substrate wood.

One commonly used wood treatment substance free from hazardous ingredients is linseed oil, a common vegetable oil and long oil alkyd derived from flax seeds, which contains lipids, linolenic fatty acids, linoleic fatty acids and alpha tocopherol. Its high color gardner 1953 of 12-max. provides a small amount of UV protection. In addition to the color, the strongest form of vitamin E alpha tocopherol is available as well as linolenic fatty acids (omega-3) and linoleic fatty acid (omega-6). The relatively high linolenic fatty acid concentration of 51-56% found in linseed oil may result in a yellowing of the oil after prolonged sun and/or ultraviolet light exposure.

Red raspberry seed oil, an organic caneberry seed oil, is known to deeply penetrate substrates such as wood and is further known to contains two classes of macromolecules, namely lipids and carbohydrates.

When combined, linseed oil and red raspberry seed oil contain carbohydrates and lipids which are two of the four main classes of macromolecules found in all living things, including, living trees as well as harvested trees which are subsequently milled into cut wood.

SUMMARY

The combination of primary, secondary and tertiary components of the treatment according to embodiments of the disclosure restores or rejuvenates growing and harvested woods, in part, by supplying vitamin E mixed tocopherols, carbohydrates, lipids, proteins, nucleic acids, amino acids, minerals, nitrogen, fatty acids, vitamins and chlorophyll.

A treatment in accordance with disclosed embodiments extends the service life of wood by replenishing and rejuvenating the minerals, amino acids, carbohydrates, lipids, proteins, nucleic acids, nitrogen, fatty acids, chlorophyll and vitamin E mixed tocopherols for broad spectrum UV-A and UV-B ultraviolet radiation protection of both interior and exterior wood. All components are safe to humans, plants and animals, are edible, contain substantially zero volatile organic compounds, are biodegradable, solid, renewable, sustainable, organic, anti-carcinogen, anticancer and anti-inflammatory.

DETAILED DESCRIPTION

Embodiments of the disclosure include coatings, sealers and treatments which substantially minimize ultraviolet degradation of treated substrates such as wood. The embodiments are free of volatile organic compounds, while drying quickly after application. Components of the embodiments further provide rejuvenating nutrition to the substrate to which the embodiments have been applied. Rejuvenating nutrition is, at least in part, provided by plant-based, oxygen-loving electrons from unsaturated fatty acids.

According to some embodiments, the disclosed treatment is plant based biological green. For the purposes of the disclosure, plant based biological green may be defined as at least 99% plant based, of the nature of living matter or of or connected with biology and not contaminating groundwater or contributing to air pollution while being free from carcinogens and toxins.

A primary component of the treatment according to the disclosed embodiments comprises a quick-drying, tack free, hydrophobic, penetrating oil. In a preferred embodiment, the primary component includes a vegetable oil/long oil alkyd having one or more driers to accelerate the drying of the vegetable oil by facilitating chemical crosslinking by way of oxygen. Suitable vegetable oils include those having a high solids content, are soluble, deeply penetrate and provide broad spectrum UV protection to the substrate to which they are applied. In some embodiments, the oil may be free from driers.

Examples of desirable vegetable oils for use in disclosed embodiments include but are not limited to linseed oil; raw, cold-pressed linseed oil/flaxseed oil/flax oil; safflower oil; and tung oil. Examples of driers include one or more metals such as cobalt, manganese, or iron oxide. In preferred embodiments, the vegetable oil comprises a scientific boiled linseed oil having manganese and cobalt driers, a high color gardner 1953 of between 11 and 13, a linolenic fatty acid to linoleic fatty acid ratio of between approximately 2.8:1 and 3.5:1 and having less than 0.1% of any material listed as carcinogenic by NTP, IARC, or OSHA. An example of such an oil is commonly available under the product name Scientific Boiled Linseed Oil which is offered for sale by Archer Daniels Midland.

A secondary component of the treatment according to the disclosed embodiments comprises an edible organic oil having unsaturated fatty acid profiles greater than 91% and providing additional vitamin E offering broad spectrum UV-A and UV-B protection to a treated substrate. Suitable organic oils include oils having a high linoleic fatty acid to linolenic fatty acid ratio relative to any vegetable oil contributing to the primary element and further provide carbohydrates, antioxidants, mixed tocopherols and, in some embodiments, additional driers. Such suitable organic oils contain electron-rich nutrition, oxygen loving double unsaturated C18:1 oleic, C18:2 linoleic and C18:3 linolenic fatty acids.

Examples of organic oils usable as a secondary component of the treatment include but are not limited to cold pressed caneberry oils such as red raspberry seed oil, black raspberry seed oil, strawberry seed oil, cranberry seed oil, carrot seed oil, hemp seed oil and sesame seed oil. In preferred embodiments, the organic oil comprises red raspberry seed oil having a linoleic acid content of approximately 53% and a linoleic fatty acid to linolenic fatty acid ratio of between approximately 1.75:1 as well as alpha-, delta- and gamma-tocopherols.

The secondary component improves the curing of the primary component by reducing the amount of linolenic fatty acid and increasing the amount of linoleic fatty acid in the treatment. The addition of red raspberry oil to drier-added linseed oil in a ratio of between approximately 1:10 and 1:19 decreases linolenic fatty acid content to between approximately 451 grams and approximately 479 grams per while increasing the amount of linoleic fatty acid to between approximately 157 grams and approximately 195 grams per liter over drier-added linseed oil alone.

Improved curing offers a reduced residual unsaturation in the cured film coating of drier-added linseed oil and a softer film to reduce wood splintering, chipping, cracking and facilitate wood self-repair. An additional aspect of improved curing includes faster drying times due to increased linoleic fatty acids.

A still further advantage of the addition of the secondary component to drier-added linseed oil is the dramatic diminishing of yellowing from UV exposure associated with drier-added linseed oil alone. While both drier-added linseed oil and a secondary component in accordance with embodiments of the disclosure contain vitamin E alpha- and gamma-tocopherol, the secondary component also contains vitamin E delta-tocopherol. Mixed tocopherols in embodiments of the disclosure result in a broad spectrum UV radiation substrate protection product, while diminishing photo-oxidation on both interior and exterior substrate surfaces by the UV radiation in sunlight.

A tertiary component of the disclosed embodiments comprises a multi-vitamin formulation for supplying nutrients to a substrate which are not present in the primary and secondary components of the treatment. A suitable multi-vitamin may be provided in a liquid form and may include proteins, carbohydrates, nucleic acids, vitamins, amino acids, minerals, chlorophyll, fatty acids and nitrogen. In one preferred embodiment, the multi-vitamin is 100% plant based.

Vitamins supplied by the multi-vitamin may include but are not limited to one or more of Vitamin A, Vitamin C, Vitamin D, Vitamin E, Vitamin K, Vitamin B1, Vitamin B2, Niacin, Vitamin B6, Vitamin B9, Vitamin B12, Vitamin B7, Vitamin B5, Rutin, folic acid and Lutein. Vitamin A may be provided in the form of retinol palmitate, alpha carotene, beta carotene or a combination of these. Vitamin C may be provided as calcium ascorbate. Vitamin D may be provided as ergocalciferol, cholecalciferol or a combination of these. Vitamin E may be provided as d-alpha tocopheryl acetate. Vitamin K may be provided as phytonadione, natural phylloquinone or a combination of these. Vitamin B1 may be provided as thiamine mononitrate, thiamin pyrophosphate or a combination of these. Niacin may be provided as nicotinic acid, niacinamide, inositol hexanicotinate or a combination of these. Vitamin B6 may be provided as pyridoxine HCL. Vitamin B12 may be provided as cyanocobalamin, methyl-cobalamin or a combination of these. Vitamin B7 may be provided as d-biotin. Vitamin B5 may be provided as d-calcium pantothenate.

While the exact amount of each of these vitamin substances may vary, in a preferred embodiment, the tertiary component provides approximately 200 IU of vitamin E as d-alpha tocopheryl acetate for UV protection. However, in one embodiment, the tertiary component provides as little as 55 IU of vitamin E as a combination of d-alpha-tocopherol, d-gamma tocotrienol, d-delta tocotrienol and d-alpha tocotrienol.

The tertiary component may also include one or more of the minerals boron, calcium, iron, iodine, magnesium, zinc, selenium, copper, manganese, chromium, molybdenum, sodium, and potassium. Boron may be provided as amino acid chelate. Calcium may be provided as ascorbate, pantothenate or a combination of these. Iodine may be provided as potassium iodide. Magnesium may be provided as magnesium gluconate. Zinc may be provided as zinc gluconate. Slenium may be provided as L-selenomethionine. Copper may be provided as sodium copper chlorophyllin. Manganese may be provided as manganese sulfate. Chromium may be provided as polynicotinate. Molybdenum may be provided as sodium molybdate. Potassium may be provided as potassium gluconate, citrate or ascorbate or a combination of these.

In addition to the listed vitamins and minerals, the tertiary component may include Spirulina, Chlorella and Blue Green Algae to provide additional vitamins, minerals, chlorophyll, all four classes of organic compounds as well as a plurality of amino acids including Glutamine, Asparagine, Leucine, Alanine, Arginine, Lysine, Threonine, Valine, Glycine, Isoleucine, Serine, Proline, Phenylalanine, Tyrosine, Histidine, Methionine, Tryptophan and Cysteine. These amino acids may alternatively be provided in other forms.

Some embodiments of the treatment may include a formulation of the tertiary component further comprising powdered, pureed, juiced or otherwise processed forms of vegetables, fruits and organic mushroom such as: parsley, kale, spinach, wheat grass, brussels sprout, asparagus, broccoli, cauliflower, beet, carrot, cabbage, garlic, plum, cranberry, blueberry, strawberry, blackberry, bilberry, cherry, apricot, papaya, orange, grape, pineapple, mycelium, primordium sclerotium and fruit body of cordyceps, reishi, shiitake, hiratake, maitake, yamabushitake, himematsutake, kawaratake, chaga, zhu ling, agarikon and mesima.

Liquid multi-vitamins suitable for use as a tertiary component are commercially available under various product names.

To produce an embodiment of the treatment, the primary, secondary and tertiary components are combined in a container such that 89-94% of the treatment, by weight, comprises vegetable oil, 5-9% by weight, comprises organic oil and 1-2% by weight comprises liquid multi-vitamin. In a preferred embodiment, the treatment comprises 93% by weight scientific boiled linseed oil, 6% by weight red raspberry seed oil and 1% by weight multi-vitamin having 200 IU of Vitamin E and oleic, linoleic and linolenic unsaturated fatty acids for improved drying. According to one process a stirrer attached to an electric drill motor is used to thoroughly mix the three components together starting the stirring action on the bottom of the container, moving upward to the top of the container and then from top to bottom again. This amount of stirring is generally enough to properly mix the components. To store following mixing, a lid is placed on the container and sealed securely.

While embodiments of the treatment may find application in treating a variety of substrates such as leather, fiberglass, stonework, laminated veneer lumber, concrete and masonry, the preferred embodiment may provide the greatest benefit to organic substrates such as wood. When the substrate is formed of wood, the wood may be shaped, processed or assembled into a variety of articles including but not limited to indoor and outdoor furniture, decks, cabinetry, buildings and equipment. Since the treatment is food safe, it may be used on articles used to support, hold or store food or other comestibles.

In a preferred process of application of a treatment in accordance with embodiments of the disclosure, the treatment is applied to uncoated surfaces of a substrate. The surface of the substrate should be clean and as free from debris as possible and the treatment may be applied to damp-to-dry wood. In the case of a wood substrate, uncoated wood surfaces permit much deeper penetration of wood rejuvenating components of the treatment. Depending on the type of substrate to be treated and other circumstances such as its location relative to surrounding objects, a variety of treatment application methods may be used. Examples of application methods include but are not limited to brushing, dipping, soaking, rolling with one or more rollers, spraying with a commercial airless sprayer or hand rubbing with an absorbent article.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed is:

1. A wood treatment having substantially no volatile organic compounds, comprising:
   89 to 94 wt % linseed oil, wherein the linseed oil comprises manganese and cobalt dryers;
   5 to 9 wt % red raspberry seed oil; and
   1 to 2 wt % liquid supplement, wherein the supplement comprises a plurality of vitamins, a plurality of minerals, nitrogen, nucleic acids, carbohydrates, fatty acids, glutamine, asparagine, leucine, alanine, arginine, lysine, threonine, valine, glycene, isoleucine, serine, proline, phenylalanine, tyrosine, histidine, methionine, tryptophan and cysteine.

2. A wood treatment, comprising:
   89 to 94 wt % linseed oil;
   at least one organic oil; and
   a liquid supplement comprising a plurality of vitamin and minerals.

3. The wood treatment of claim 2, wherein the supplement further comprises:
   glutamine, asparagine, leucine, alanine, arginine, lysine, threonine, valine, clycine, isoleucine, serine, proline, phenylalanine, tyrosine, histidine, methionine, tryptophan and cysteine.

4. The wood treatment of claim 2, wherein the supplement further comprises:
   nucleic acids.

5. The wood treatment of claim 2, wherein the supplement further comprises:
   calcium ascorbate, d-alpha tocopheryl acetate, pyridoxine HCL, d-biotin, d-calcium pantothenate, rutin, folic acid;
   one or more of retinol palmitate, alpha carotene and beta carotene;
   one or more of ergocalciferol and cholecalciferol;
   one or more of phytonadione and natural phylloquinone;
   one or more of thiamine mononitrate and thiamin pyrophosphate;
   one or more of nicotinic acid, niacinamide and inositol hexanicotinate; and
   one or more of cyanocobalamin and methylcobalamin.

6. The wood treatment of claim 2, wherein the supplement further comprises:
   boron, iron, sodium, potassium iodide, magnesium gluconate, zinc gluconate, L-selenomethionine, sodium copper chlorophyllin, manganese sulfate, polynicotinate, sodium molybdate;
   one or more of potassium gluconate, citrate and ascorbate; and
   one or more of ascorbate and pantothenate.

7. The wood treatment of claim 2, wherein at least one organic oil makes up from 5 to 9 wt % of the treatment.

8. The wood treatment of claim 2, wherein the supplement makes up from 1 to 2 wt % of the treatment.

9. The wood treatment of claim 2, wherein the at least one organic oil has a linolenic fatty acid content by weight less than that of the linseed oil such that the wood treatment includes a linolenic fatty acid content between approximately 451 and approximately 479 grams per liter.

10. The wood treatment of claim 2, wherein the at least one organic oil has a linoleic fatty acid content by weight greater than that of the linseed oil such that the wood treatment includes a linoleic fatty acid content between approximately 157 and approximately 195 grams per liter.

11. The wood treatment of claim 2, wherein the at least one organic oil further comprises:
    alpha-tocopherol;
    delta-tocopherol; and
    gamma-tocopherol.

12. The wood treatment of claim 2 comprising:
    substantially no volatile organic compounds.

13. The wood treatment of claim 2, wherein:
    the treatment is biodegradable.

14. The wood treatment of claim 2, wherein:
    the treatment is anti-inflammatory.

15. The wood treatment of claim 2, wherein:
    the treatment is plant based biological green; and
    plant based biological green is defined as at least 99% plant based and not contaminating ground water or contributing to air pollution while being free from carcinogens and toxins.

16. The wood treatment of claim 2, wherein the at least one organic oil comprises:
    at least one caneberry seed oil.

17. The wood treatment of claim 16, wherein the at least one caneberry seed oil comprises:
    red raspberry seed oil.

18. A product, comprising:
    a wood substrate; and
    a protecting treatment applied to the wood substrate for reducing ultraviolet light damage to the wood substrate, wherein the treatment comprises:
    89 to 94 wt % linseed oil,
    red raspberry seed oil, and
    a supplement including a plurality of vitamins and minerals.

* * * * *